May 20, 1941.                 D. E. ALTON                    2,242,738
                             DAMPER DEVICE
                          Filed April 22, 1940
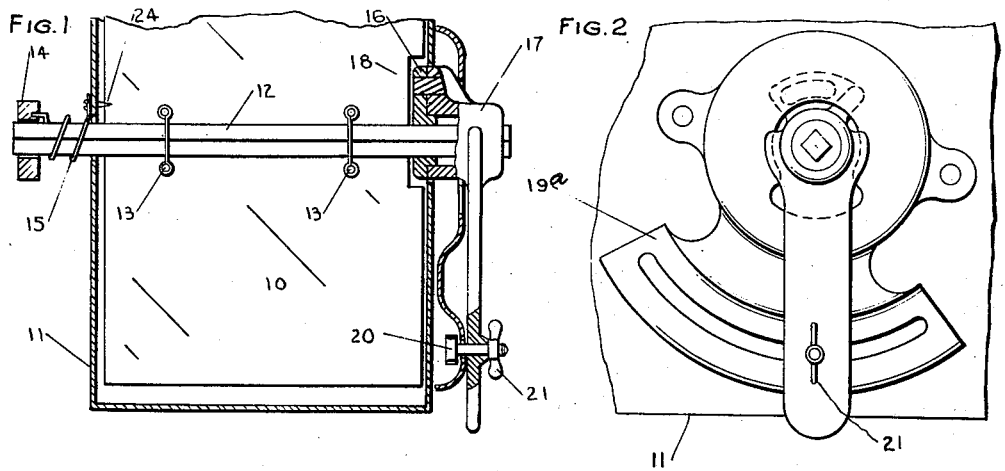
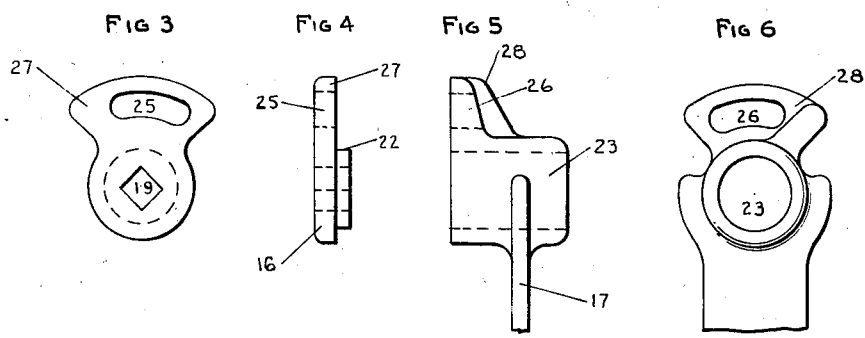
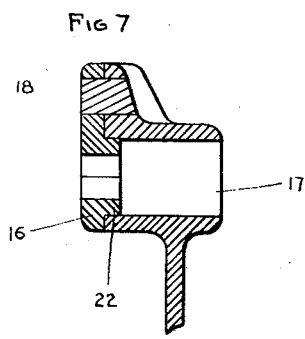
INVENTOR
David E. Alton Patented May 20, 1941

2,242,738

UNITED STATES PATENT OFFICE 2,242,738

DAMPER DEVICE

David E. Alton, New York, N. Y.

Application April 22, 1940, Serial No. 330,890

7 Claims. (Cl. 126—287.5)

This invention relates to improvements in a damper regulating device and more particularly to a damper device which can operate both as an automatic fire control device and as a manually operable regulating device.

The principal object of the invention is to provide a fire control and protective construction for ducts for air cooling systems and the like, which is adapted to effectively close the duct whenever the temperature of the air passing therethrough reaches or exceeds a certain pre-determined temperature.

Another object of the invention is to provide a novel fire control device for ducts and the like, said device comprising a handle member and a coupling member normally held together by a fusible plug, said coupling being adapted to move relative to said handle whenever the fusible plug is caused to melt or fuse.

Another object of the invention is to provide a damper fire control and protective device which is of simple construction and inexpensive to fabricate and which can be readily attached or assembled on new or existing installations to convert all dampers to fire protective dampers, for preventing the spread of fire by means of air ducts within any building or structure.

Other objects of the invention will be set forth in the following description and drawing which illustrate a preferred embodiment thereof, it being understood that the foregoing statement of the objects of the invention is intended to generally explain the same without limiting it in any manner.

Fig. 1 is a side view partially in section showing the device as applied to a duct.

Fig. 2 is a front view of the device.

Fig. 3 is a front view of the coupling member of the device.

Fig. 4 is a side view thereof.

Fig. 5 is a side view of the handle portion of the device, with a part thereof being broken away.

Fig. 6 is a front view thereof.

Fig. 7 is a sectional view partially broken away of the coupling and handle members held together by the fusible plug member.

Referring to the drawing, and particularly to Fig. 1 thereof, the reference letter 10 designates a damper or gate installed in duct 11. A rod 12 having a square cross-section is secured to damper 10 by means of straddling members 13. The rear end of rod 12 extends out of duct 11 and is provided with a collar 14, having a square opening adapted to fit over the rear end of said rod and turn therewith. A torsion spring 15, having one end secured to collar 14 and the opposite end thereof secured to a point or the side of duct 11 by means of a screw 24, normally maintains rod 12 and consequently damper 10 under tension, which tends at all times to bring damper 10 to its closed position, should it be free to rotate.

The front end of damper rod 12 extends beyond the front wall of duct 11. Positioned on the end of said rod 12 is the improved handle device which is the subject of the invention herein. Said handle device generally comprises a coupling member 16 and a handle portion 17, held together by a fusible plug 18.

As shown in Fig. 3, coupling member 16 is formed with a square opening 19, whereby said coupling can fit over the front end of rod 12 and rotate therewith. Coupling member 16 is also formed with the integral shoulder 22 which fits into bore or opening 23 formed in handle portion 17, as is clearly shown in Figs. 4 and 7. Shoulder 22 is preferably formed at the peripheral edge of opening 19. Coupling 16 is also provided with the integral lateral extension 27, having an opening 25 formed therein. Handle portion 17 is formed with a head 28 which is provided with a central coupling shoulder engaging bore 23 and a plug receiving opening 26, said plug receiving opening having the same cross-section and being complementary to opening 25 in coupling 16.

In assembling the coupling member 16 and handle portion 17, coupling 16 is so positioned that its shoulder 22 fits within bore 23 of handle portion 17. Openings 25 and 26 are then aligned so that they register. The fusible metal is then poured into registered openings 25 and 26, thus holding the coupling 16 and the handle portion 17 together so that they will move in unison. Before fusible plug 18 is formed, coupling 16 is adapted to move relative to handle portion 17. The assembled position of the invention is shown in Fig. 7. To form fusible plug 18, any well known type of fusible alloy may be used depending upon the maximum safe temperature. For example such alloys as Rose metal, Wood's metal, Lipowitz alloy, etc., may be employed for this purpose.

When coupling 16 and handle portion 17 are assembled, and held together by fusible plug 18, the improved device can operate as a regulating device. In other words, the assembled unit may be used for manually setting the position of the damper against the spring tension of spring 15.

The position of handle 17 can be set by the quadrant or guide member 19a, bolt 20 and wing nut 21, as illustrated in Figs. 1 and 2.

Should the temperature of the air or gases passing through duct 11 reach or exceed a certain predetermined temperature, then the assembled device automatically acts as a fire control and protective device in the following manner:

After the damper has been set in any position from full open to closed, should fusible plug 18 melt or fuse, coupling 16 will be free to rotate (guided by its shoulder 22 in bore 23) to a closed position against a stop such as screw 24, or any suitable stop, by the tension of spring 15 on collar 14, thus completely closing the duct and preventing the further passage of the air or gases through the duct. When fusible plug 18 melts or fuses, coupling member 16 is released and rotates with damper 10 and rod 12 until said damper reaches its fully closed position.

The application of the spring for closing the damper upon the fusing of plug 18 was utilized because of its simplicity. However, any other means, such as a weight etc. could be employed to close the damper.

Screw 24 can be used to secure an end of spring 15 to the wall of duct 11 and also to act as a stop for damper 10. However, any other convenient stop may be employed to prevent the damper from going beyond its fully closed position.

The important feature of the invention is that it may be readily applied and installed on all dampers which previously were only regulating dampers and offered no protection against the transmission of fire or heated air and gases within a duct system. With the improved construction installed, the damper not only acts as a regulating damper but also at the same time as a fire damper, thus preventing the passage of fire through the ducts.

By employing the invention herein, all volume dampers may be used as previously to regulate the quantity of air and should a fire start at any part of the system, the resulting heat will cause fusible plug 18, in each damper handle, to fuse permitting and causing each damper to close, thus presenting a barrier to the spread of the fire.

Since every duct system is provided with several regulating dampers, the use of the improved construction at several points in place of the handle now commonly used, will offer a great deal more fire protection than is now available with the customary one or two special fire dampers required by the fire codes in various cities.

Since by the use of the invention herein no specially constructed dampers are required nor are any access doors needed to reset the dampers as is now required, a definite saving in expense will be realized.

The principal novelty of the invention resides in the provision of a two piece damper regulator arm comprising a cupling member and a handle portion held rotationally rigid by a fusible plug. The coupling is secured to the damper rod and when the heat passing through the duct (as a matter of fact irrespective of where the heat is coming from) reaches the melting point of the fusible plug and said plug fuses, the coupling is adapted to rotate relative to said handle member and the damper is automatically brought to a closed position by the action of the springs or weights.

I have described a preferred embodiment of my invention but it is obvious that numerous omissions and changes can be made without departing from its spirit. For example, the fusible plug may be of any shape and may assume different positions relative to the coupling and handle portion.

I claim:

1. A handle device for dampers comprising a coupling member having a shoulder integral therewith, a handle portion adapted to receive said shoulder, said handle portion and coupling member having aligned openings which register with each other, a fusible plug member engaging said openings and adapted to hold said handle portion and coupling member rotationally rigid, said coupling member being adapted to rotate relative to said handle portion and close the damper when the fusible plug is caused to melt.

2. A device of the character described comprising a coupling member having a first opening, a shoulder integral with said coupling formed at the peripheral edge of said opening, a handle member having a first opening adapted to receive said shoulder, said coupling and handle members having aligned second openings adapted to receive a fusible plug, said fusible plug being adapted to hold said coupling and handle members rotationally rigid, said coupling member being adapted to rotate relative to said handle member when the fusible plug is caused to fuse.

3. A damper device comprising a coupling member having a central bore adapted to receive a damper bar, said coupling member having a shoulder formed integral therewith, a handle member having a central bore adapted to receive said shoulder and said damper bar, said coupling and handle members having openings which register with each other, a fusible plug member engaging said registering openings and adapted to hold said handle and coupling members rotationally rigid, said coupling member being adapted to rotate relative to said handle member when the fusible plug is caused to melt.

4. A damper construction for ducts and the like comprising a damper bar, a gate secured to said bar and adapted to rotate therewith, a handle portion secured to the front end of said damper bar, said handle portion comprising a coupling member and a handle member held together by a fusible plug, said coupling member adapted to rotate relative to said handle member when the fusible plug is caused to melt, and means secured to the inner end of the damper bar adapted to return the gate to its closed position when the fusible plug is caused to melt.

5. A damper construction as claimed in claim 4 in which the coupling member is formed with an integral shoulder and the handle member with a central bore adapted to receive the said shoulder.

6. A handle device for dampers comprising a coupling member having a shoulder integral therewith, a handle member having an opening adapted to receive said shoulder, said coupling member being normally rotatable relative to said handle member, said coupling and handle members having aligned openings adapted to receive a fusible insert, said fusible insert being adapted to hold said coupling and handle members rotationally rigid, said coupling member being adapted to rotate relative to said handle member when the fusible insert is caused to melt.

7. A regulating device for dampers comprising a coupling member having a shoulder and a lateral extension formed integral therewith, said extension having a plug receiving opening formed therein, a handle member having a head portion and an arm portion, said head portion having a bore adapted to receive said shoulder, said head portion also having a plug receiving opening formed therein, said plug receiving opening being complementary to and registering with the plug receiving opening formed in the lateral extension of the coupling member, a fusible plug member engaging said registering plug receiving openings and adapted to hold said handle and coupling members rotationally rigid, said coupling member being adapted to rotate relative to said handle member when the fusible plug is caused to melt.

DAVID E. ALTON.